US008400435B2

(12) United States Patent
Speirs et al.

(10) Patent No.: US 8,400,435 B2
(45) Date of Patent: Mar. 19, 2013

(54) CIRCUIT ARRANGEMENT FOR A DISPLAY DEVICE WHICH CAN BE OPERATED IN A PARTIAL MODE

(75) Inventors: Christopher Rodd Speirs, Zürich (CH); Wilfried Hasselberg, Adliswil (CH)

(73) Assignee: Entropic Communications, Inc., San Diego, CA (US)

( * ) Notice: Subject to any disclaimer, the term of this patent is extended or adjusted under 35 U.S.C. 154(b) by 452 days.

(21) Appl. No.: 10/518,772

(22) PCT Filed: Jun. 17, 2003

(86) PCT No.: PCT/IB03/02763

§ 371 (c)(1), (2), (4) Date: Aug. 1, 2005

(87) PCT Pub. No.: WO04/001708

PCT Pub. Date: Dec. 31, 2003

(65) Prior Publication Data

US 2006/0061520 A1 Mar. 23, 2006

(30) Foreign Application Priority Data

Jun. 22, 2002 (EP) .................................... 02013872

(51) Int. Cl.
*G06F 5/00* (2006.01)

(52) U.S. Cl. ............ 345/204; 345/98; 345/100; 345/55; 345/99

(58) Field of Classification Search ............ 345/98–100, 345/211–213, 204–206, 55
See application file for complete search history.

(56) References Cited

U.S. PATENT DOCUMENTS

| | | | | |
|---|---|---|---|---|
| 4,608,558 | A | 8/1986 | Amstutz et al. | |
| 4,922,240 | A * | 5/1990 | Duwaer | 345/100 |
| 5,394,166 | A | 2/1995 | Shimada | |
| 5,600,343 | A * | 2/1997 | Sarrasin | 345/75.2 |
| 6,137,481 | A | 10/2000 | Phillipps | |
| 6,229,515 | B1 | 5/2001 | Itoh et al. | |

(Continued)

FOREIGN PATENT DOCUMENTS

| | | |
|---|---|---|
| CN | 1186394 | 7/1998 |
| CN | 1320900 | 11/2001 |

(Continued)

OTHER PUBLICATIONS

English Abstract of JP 2002351414, publication date Jun. 12, 2002, downloaded from espacenet.com on Aug. 12, 2010.

*Primary Examiner* — Lun-Yi Lao
*Assistant Examiner* — Shaheda Abdin

(57) ABSTRACT

A circuit arrangement for controlling a display device which can be operated in a partial mode, the circuit arrangement including a row drive circuit for driving n rows of the display device and a column drive circuit for driving m columns of the display device. The row drive circuit controls the n rows of display device sequentially from 1 to n, and the column drive circuit supplies column voltages to the m columns. The column voltages corresponding to the picture data to be displayed of pixels of the controlled row. A logic function is connected in front of at least one output of the row drive circuit, and a first control signal is supplied to the logic function. The first control signal achieving a deactivation/activation of the at least one output of the row drive circuit in dependence on the partial mode of the display device.

12 Claims, 2 Drawing Sheets

U.S. PATENT DOCUMENTS

| | | | | |
|---|---|---|---|---|
| 6,323,849 | B1* | 11/2001 | He et al. | 345/204 |
| 6,392,701 | B1 | 5/2002 | Akeyama et al. | |
| 6,628,259 | B2* | 9/2003 | Hashimoto | 345/98 |
| 6,633,287 | B1* | 10/2003 | Yatabe et al. | 345/211 |
| 6,803,898 | B2 | 10/2004 | Ishii | |
| 2001/0017611 | A1 | 8/2001 | Moriyama | |
| 2001/0033278 | A1* | 10/2001 | Ohta et al. | 345/204 |
| 2001/0052887 | A1* | 12/2001 | Tsutsui et al. | 345/87 |
| 2002/0000969 | A1 | 1/2002 | Ozawa | |
| 2002/0190944 | A1 | 12/2002 | Morita | |
| 2003/0011586 | A1 | 1/2003 | Nakajima | |
| 2003/0025665 | A1* | 2/2003 | Janssen et al. | 345/98 |

FOREIGN PATENT DOCUMENTS

| | | | |
|---|---|---|---|
| EP | 0662678 | | 7/1995 |
| EP | 0974952 | | 12/1995 |
| JP | 08-254966 | | 1/1996 |
| JP | 10232645 | A | 9/1998 |
| JP | 2001109439 | A | 4/2001 |
| JP | 2001-242841 | | 7/2001 |
| JP | 2001-242818 | | 9/2001 |
| JP | 2001356746 | A | 12/2001 |
| JP | 2002-049346 | | 2/2002 |
| JP | 2002-351414 | | 6/2002 |
| JP | 2002175049 | A | 6/2002 |

* cited by examiner

CIRCUIT ARRANGEMENT FOR A DISPLAY DEVICE WHICH CAN BE OPERATED IN A PARTIAL MODE

RELATED APPLICATIONS

This application claims the priority benefits of PCT International Application PCT/IB2003/002763, filed Jun. 17, 2003, which claims priority to European Patent Application No. 02013872.3, filed Jun. 22, 2002.

The invention relates to a circuit arrangement for controlling a display device which can be operated in a partial mode, comprising a row drive circuit for driving n rows of the display device and a column drive circuit for driving m columns of the display device, wherein the row drive circuit controls the n rows of the display device sequentially from 1 to n, and the column drive circuit supplies column voltages to the m columns, which voltages correspond to the picture data to be displayed of pixels of the controlled row. The invention further relates to a display device with such a circuit arrangement, a row drive circuit for a display device, an electronic apparatus with a display device, and a method of realizing a partial mode on a display device.

Display technology claims an ever more important role in information and communication technology. As an interface between man and the digital world, a monitor device or a display is of central importance for the acceptance of modem information systems. It is in particular portable apparatuses such as, for example, notebooks, telephones, digital cameras, and personal digital assistants that cannot be realized without the use of displays. There are two kinds of displays in principle. These are on the one hand passive matrix displays, and on the other hand active matrix displays. The invention relates in particular to passive matrix displays which are used inter alia in laptop computers and mobile telephones. Large displays can be realized in passive matrix display technology, most of these being based on the (S)TN (Super Twisted Nematic) effect.

Energy consumption is a particularly important criterion in portable electronic devices, because the service life of the battery of the device, and thus the period of use of the device, is dependent thereon. A frequently used method of saving energy is offered by the partial mode. Partial regions of the display are activated only in this mode. The inactive regions of the display and also the components necessary for controlling these regions are switched off, so that they require no energy.

A passive matrix display is basically constructed in the form of a matrix. The display is controlled via column supply lines and row supply lines which are arranged perpendicularly to one another. The supply lines to the columns and rows are present on different glass substrates, between which a liquid crystal is present. Addressing of the display is passive, i.e. there is no active switch (for example a thin-film transistor) for each individual pixel. Instead, the information is sequentially written into the display row by row by means of suitable combinations of voltages applied to the rows and columns. The pixel can be set for at least two different switching states by means of different voltages applied to the column and row contacts. A single pixel is formed by the intersection of one column supply line and one row supply line. The material used for the rows and columns is, for example, transparent indium-tin oxide (ITO).

A partial mode is realized in known circuit arrangements in that the signal controlling the rows of the row drive circuit is conducted past rows that are not to be displayed by means of complicated multiplex circuits, such that this signal does not arrive at the row output point for the row that is not to be displayed. This requires a high expenditure in achieving a communication between the control logic and the row drive circuit.

It is an object of the invention to provide an arrangement for controlling a display device in which the expenditure for realizing a partial mode and thus also the energy consumption and cost of the display device are reduced.

This object is achieved with a circuit arrangement for controlling a display device which can be operated in a partial mode, comprising a row drive circuit for driving n rows of the display device and a column drive circuit for driving m columns of the display device, wherein the row drive circuit controls the n rows of the display device sequentially from 1 to n, and the column drive circuit supplies column voltages to the m columns, which voltages correspond to the picture data to be displayed of pixels of the controlled row and wherein in addition a logic function is included in the row drive circuit in front of at least one row output, to which logic function a first control signal can be supplied, said first control signal achieving a deactivation/activation of the row output in dependence on the partial mode.

It is necessary in realizing a partial mode to implement a control logic both in the column drive circuit and in the row drive circuit, by means of which logic individual rows can be deactivated. It is furthermore necessary in the supply of the column voltages to feed only those column voltages which are designed for pixels in rows which are to be shown or activated. The column and row drive circuits are interrelated via control lines, through which the control commands or signals are exchanged.

It is suggested according to the invention that row outputs of the row drive circuit for rows which should not be shown in the partial mode or which are inactive are switched off or deactivated by means of a first control signal (row_enable). This first control signal (row_enable) is supplied to the row drive circuit of a control logic which is arranged in the row drive circuit. A row counter is present in the control logic. This row counter runs through the number of rows of the display from 1 to n. It is thus known to the control logic at each and every moment which row is being controlled. The control logic controls the supply of voltages to the column supply lines corresponding to the picture data of the instantaneous row to which column voltages are applied. In the case of a row which is not to be displayed, no new voltage values are applied to the column lines. The voltages applied to the column lines remain applied thereto until a row is controlled which is to be displayed. That means that the column voltages applied to the previous row to be displayed remain applied for a row not to be displayed. Since the row not to be displayed is not controlled, i.e. receives no voltage from the row supply line, no pixels are shown in this row, because a display of pixels in a row takes place only if a voltage is present on both of the intersecting conductor tracks, which leads to a state change or a rotation of the crystals in this pixel, whereby this pixel is made visible.

The row drive circuit is operated with a clock signal (row clock). The clock signal indicates the speed with which a jump is made from one row to the next. This clock signal accordingly influences the duration necessary for traversing the n rows of a display. The necessary control logic in the row drive circuit is thus reduced to those logic functions which can be realized by means of simple AND gates. Only one signal need be transmitted from the control logic in the row drive circuit for deactivating or activating row outputs for a partial mode.

In an advantageous embodiment of the invention, a shift register is provided in the row drive circuit such that the number n of the outputs and stages of the shift register corresponds to the number of rows of the display. A logic function is associated with at least one output of the shift register. Preferably, a logic function is associated with each output of the shift register. This logic function is connected between the relevant output of the shift register and the row output each time. The first control signal (row_enable) is supplied to the at least one logic function. Preferably, it is supplied to all logic functions. This renders it possible to achieve the deactivation/activation of the row outputs for realizing a partial mode by means of no more than the first control signal.

A second control signal (row_pulse) is supplied to the input of the shift register and is shifted step by step through the shift register. The second control signal (row_pulse) is shifted one row or step further in the shift register with each pulse of the clock signal.

When this second control signal arrives at a row which should remain inactive in the partial mode, according to the invention, all row drive outputs are switched to a deselect mode by the logic function. The first control signal (row_enable) is preferably supplied by the column drive circuit during this. Accordingly, the second control signal is indeed applied to the output of the shift register for the relevant row at that moment, but it cannot switch on the corresponding row drive output because all row drive outputs are switched off by means of the first control signal (row_enable) applied to the logic function. The second control signal accordingly continues to the next row with the next clock signal. If this row is to be displayed in the partial mode, the first control signal releases all logic functions again, and thus also the row outputs, so that the second control signal (row_pulse) can switch on or activate the corresponding next row output, and the relevant picture data can be displayed in this row thanks to the column voltages applied to the column inputs at the same time.

In an advantageous embodiment of the invention, the rhythm of the clock signal is increased for rows not to be displayed during the traversal of the second control signal through the stages of the shift register. The total traversal time for all rows in the partial mode is shortened thereby, which results in a faster refresh of the display, and image changes or moving images can be better displayed in the partial mode. In addition, the increase in the clock frequency for inactive rows renders it possible to reduce the voltages applied to the rows and columns to be displayed, which leads to a considerable energy saving because the effective number of rows of the display in the partial mode is only the number of active or displayable modes. The more rows are controlled, the higher the voltages have to be which are to be applied to the rows and columns for achieving a good display quality. A reduction in the number of rows to be controlled is also denoted a reduction in multiplexibility.

In an alternative embodiment of the invention, the clock frequency is increased for deactivated rows, whereas the clock frequency is reduced for active rows, such that the refresh rate remains constant in the partial mode for a traversal of all rows of the display. This also leads to an energy saving.

In a further advantageous embodiment of the invention, the logic functions are provided only at those row outputs which are designed for the partial mode. In certain embodiments of displays, the layout of the display defines beforehand in which rows picture data are to be displayed in the partial mode.

The supply of the first control signal (row_enable) to all connected logic functions of the row outputs renders it possible to realize a partial mode by means of a single additional signal, without the necessity of constructing the control logic of the row drive circuit in a complicated manner for a partial mode and exchanging a plurality of control commands between the column drive circuit and row drive circuit.

The invention here utilizes the idea that the full power level or display level of a portable electronic device is usually required for a short period only. Simplified displays are usually sufficient in the remaining time. The partial mode used here, in which the display is only partly driven, leads to a simplification of the control logic, so that the components can become less expensive and consume less energy.

The object is also achieved by means of a row drive circuit for controlling n rows of a display device with n outputs, wherein a logic function is connected in front of each row output, by means of which function the row outputs can be deactivated/activated in dependence on a partial mode upon the supply of a first control signal.

The object is also achieved by means of a display device with a circuit arrangement.

The object is further achieved by means of an electronic apparatus in which a display device for realizing a partial mode is used.

The object is further achieved by means of a method of realizing a partial mode, whereby a display device is controlled by a circuit arrangement comprising a row drive circuit and a column drive circuit, and wherein logic functions in the row drive circuit receive a first control signal such that the first control signal deactivates/activates row outputs of the row drive circuit in dependence on a partial mode to be displayed of the row drive circuit.

Embodiments of the invention will be explained in more detail below with reference to the drawing, in which.

Figure 1:
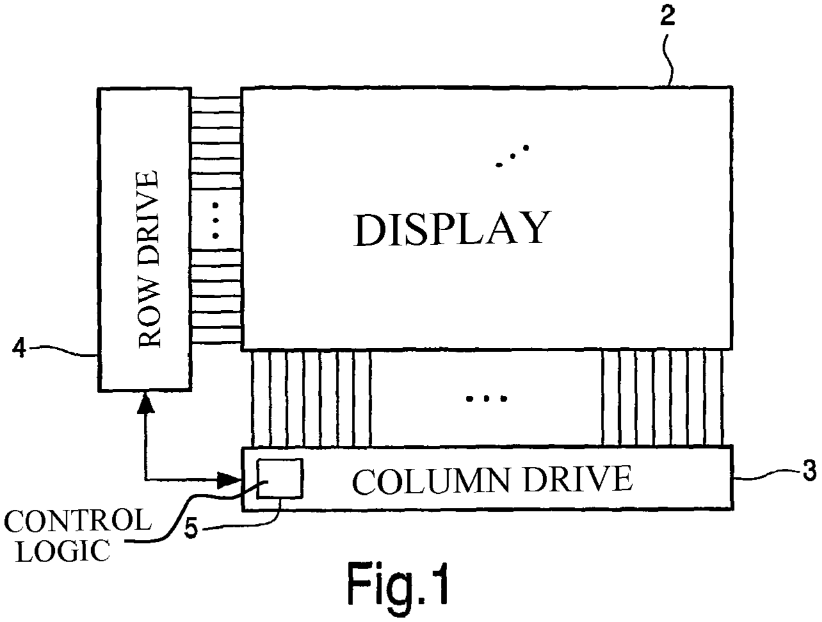
FIG. 1 is a block diagram of the control of a display device.

In FIG. 1, a block diagram shows the control of a display 2. A column drive circuit 3 and a row drive circuit 4 are connected to the display. The picture data to be displayed are stored in a memory (not shown) or are generated by a unit which is not shown.

The control logic 5 controls the voltage supply in the column drive circuit 3 and the supply of the control signals to the row drive circuit 4. The rows of the display are switched on consecutively by the row drive circuit 4, i.e. a suitable column voltage is supplied to the row whose turn it is at any given moment. The column drive circuit 3 supplies voltages to the columns of the display, corresponding to the picture data which are to be displayed in the current row. The pixels of the current row assume a state based on the combination of the column voltages and the row voltage which corresponds to the picture data to be displayed. After a row of the display has been controlled and the picture data have been shown, the row drive circuit controls the next row. The column drive circuit then supplies the corresponding column voltages which correspond to the picture data of this next row. After all rows of a display have been traversed, a new cycle is started.

Figure 2:
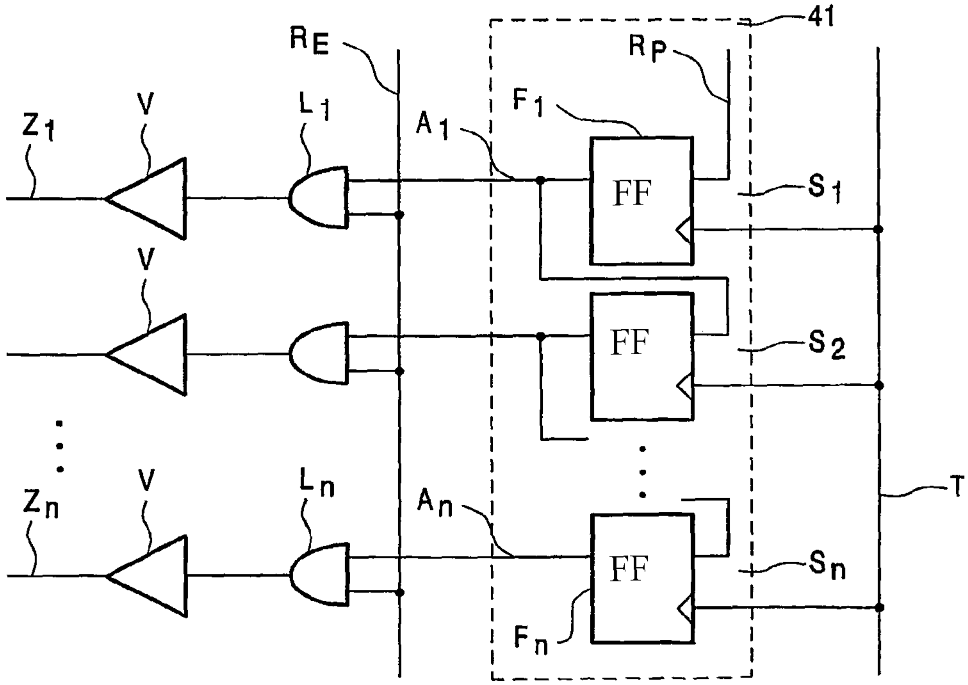
FIG. 2 shows a row drive circuit.

FIG. 2 is a detailed representation of a row drive circuit 4. The row drive circuit 4 comprises row outputs $Z_1$ to $Z_n$. A shift register 41 is furthermore provided, with stages $S_n$, the number of stages $S_n$ corresponding to the number of rows of the display 2. The stages $S_n$ in this embodiment comprise flip-flops $F_1$ to $F_n$. The second control signal $R_P$ (row_pulse) is supplied to the shift register in its first stage $F_1$. This second control signal $R_P$ is put into the shift register 41 in the form of a pulse each time when the row counter in the control logic starts counting anew at row 1. The shift register is operated with a clock signal T, i.e. the second control signal $R_P$ (row_ pulse) is shifted one step S in the shift register with each clock pulse. With each new clock pulse, accordingly, the second control signal $R_P$ is applied on the one hand to the respective output $A_1$ of the active stage $S_1$ of the shift register 41, and on the other hand also to the input of the next stage $S_2$. Furthermore, the first control signal $R_E$ is supplied to the row drive circuit 4. This first control signal $R_E$ is supplied to all connected logic functions $L_1$ to $L_n$. The respective second control signal $R_P$ applied to the relevant output $A_1$-$A_n$ of the shift register is only passed on to the relevant row output $Z_1$-$Z_n$ if all rows are released or activated by the first control signal $R_E$. If the rows are deactivated or blocked by the first control signal $R_E$, a second control signal $R_P$ applied to the output $A_1$-$A_n$ of the shift register 41 is not switched through to the row outputs. The row drive circuit 4 is fitted with an amplifier V at each row output $Z_1$-$Z_n$ for amplifying the second control signal to the required row voltage.

Figure 3:
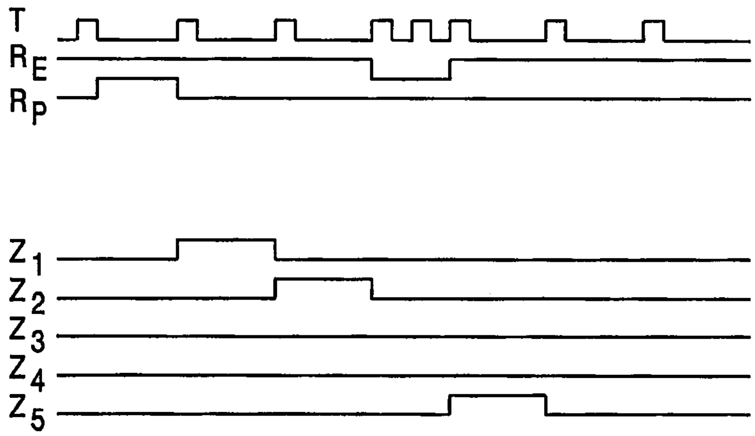
FIG. 3 shows signal gradients.

FIG. 3 shows the signal gradients of the first control signal $R_E$, the second control signal $R_P$, the clock signal T, and the signals at the row outputs $Z_1$-$Z_5$. At the first clock pulse, the second control signal $R_P$ is read into the shift register, and at the second clock pulse the first control signal $R_P$ is passed on to the row output $Z_1$, because the first control signal $R_E$ has switched all row outputs to the active state. The third clock signal issues the second control signal $R_P$ to the row output $Z_2$. Now the first control signal $R_E$ changes to the inactive state, i.e. all row outputs $Z_1$ to $Z_n$ are blocked by means of the logic functions, so that the second control signal $R_P$ cannot be switched through to the row outputs $Z_3$ and $Z_4$ during the next two clock periods. At the same time, the clock frequency is increased for the period in which the first control signal $R_E$ is in the inactive state. It is not until the first control signal $R_E$ returns to the active state again that the clock frequency is reduced again, and the second control signal $R_P$ is passed on to the row output $Z_5$.

The invention claimed is:

1. A circuit arrangement for controlling a display device which can be operated in a partial mode, the circuit arrangement comprising:

a row drive circuit for driving n rows of the display device sequentially from 1 to n, the row drive circuit responsive to a row enable signal that is provided to each row from 1 to n; and a column drive circuit for driving m columns of the display device by supplying column voltages to the m columns, the column voltages corresponding to picture data to be displayed as pixels of the controlled row, characterized in that a logic function is included in the row drive circuit in front of row outputs, the logic function configured and arranged to respond to a first control signal having one or more pulses indicative of whether or not the partial mode is to be implemented, by preventing one or more of the row outputs from driving one or more of the rows in response to the row enable signal;

wherein the row drive circuit comprises a shift register which has n stages and n outputs, and in that a second control signal can be supplied to the shift register at an input thereof for controlling the consecutive rows 1 to n, which second control signal activates the outputs of the shift register consecutively in dependence on pulses of a clock signal, and wherein the logic function is connected between the n outputs of the shift register and n amplifiers, wherein each amplifier is coupled to one of the n rows of the display, the logic function configured to prevent the n outputs of the shift register from driving any of the n rows of the display responsive to and during the one or more pulses of the first control signal;

wherein a frequency of the pulses of the clock signal increases during the one or more pulses of the first control signal, thereby increasing the refresh rate of the display.

2. A circuit arrangement as claimed in claim 1, characterized in that the logic function is connected in front of each row output.

3. A circuit arrangement as claimed in claim 2, characterized in that the first control signal is capable of switching off all n row outputs by means of the logic function during control of a line that is not to be displayed in the partial mode.

4. A circuit arrangement as claimed in claim 1, characterized in that the logic function is realized as an AND gate.

5. A circuit arrangement as claimed in claim 1, characterized in that control logic in the column drive circuit generates the first control signal in dependence on the partial mode and supplies the first control signal to the row drive circuit.

6. A circuit arrangement as claimed in claim 1, characterized in that the column drive circuit supplies no column voltages to the m columns in a case of a line that is not to be displayed.

7. A display device comprising a circuit arrangement as claimed in claim 1.

8. An electronic appliance comprising a display device as claimed in claim 7.

9. A circuit arrangement as claimed in claim 1, wherein each of the stages includes a flip-flop.

10. A circuit arrangement as claimed in claim 1, wherein the first control signal overrides the second control signal.

11. A row drive circuit for controlling n rows of a display device that is operable in a partial mode, the row drive circuit comprising:

a shift register having n stages and n outputs; and a logic function connected in front of each of the n outputs of the shift register, the logic function configured to deactivate the n outputs of the shift register in dependence on the partial mode responsive to and during one or more pulses of a first control signal by preventing the n outputs of the shift register from driving the n rows of the display device;

n amplifiers, wherein each amplifier is coupled to the logic function and one of the n rows of the display device;

wherein the outputs of the shift register are activated consecutively in dependence on pulses of a clock signal, and wherein a frequency of the pulses of the clock signal increases during the one or more pulses of the first control signal, thereby increasing the refresh rate of the display device.

12. A method of realizing a partial mode of a display device, the display device controlled by a circuit arrangement that includes a row drive circuit for driving n rows and a column drive circuit for supplying column voltages to m columns, the method comprising:

sequentially providing an enable signal to each row from 1 to n in response to pulses of a clock signal;

supplying the column voltages to the m columns for displaying corresponding picture data, deactivating all row outputs of a first row of the row drive circuit, in response to a pulse of a first control signal indicating that a first plurality of rows are not to be displayed in the partial mode of the display device, by preventing the row outputs of the first plurality of rows from driving the display device during the pulse of the first control signal, and activating all row outputs of one or more rows using an amplifier for each row output subsequent to the first plurality of rows in response to the enable signal and the end of the first control signal pulse indicating that the one or more rows are to be displayed in the partial mode;

wherein a frequency of the pulses of the clock signal increases during the pulse of the first control signal, thereby increasing the refresh rate of the display device.

* * * * *